United States Patent
Liu et al.

(10) Patent No.: US 11,770,011 B2
(45) Date of Patent: Sep. 26, 2023

(54) PROCESSING CIRCUIT, METHOD, AND ELECTRONIC DEVICE FOR MULTIPLE POWER SUPPLY PORTS

(71) Applicant: SHENZHEN WING SEMICONDUCTOR Co., Ltd., Shenzhen (CN)

(72) Inventors: Wenjun Liu, Shenzhen (CN); Songtao Chen, Shenzhen (CN)

( * ) Notice: Subject to any disclaimer, the term of this patent is extended or adjusted under 35 U.S.C. 154(b) by 217 days.

(21) Appl. No.: 17/208,598

(22) Filed: Mar. 22, 2021

(65) Prior Publication Data

US 2022/0302720 A1 Sep. 22, 2022

(51) Int. Cl.
*H02J 7/00* (2006.01)
*G06F 1/26* (2006.01)
*H02J 13/00* (2006.01)
*H02J 1/10* (2006.01)

(52) U.S. Cl.
CPC .......... *H02J 7/00034* (2020.01); *G06F 1/266* (2013.01); *H02J 7/00714* (2020.01); *H02J 7/007182* (2020.01); *H02J 2207/30* (2020.01)

(58) Field of Classification Search
CPC ............. H02J 7/00034; H02J 7/007182; H02J 7/00714
See application file for complete search history.

(56) References Cited

U.S. PATENT DOCUMENTS

| | | | | |
|---|---|---|---|---|
| 2011/0278921 A1* | 11/2011 | Fretheim | .................. | H02J 3/38 307/18 |
| 2015/0177813 A1* | 6/2015 | Bailey | .................. | G06F 1/3234 713/320 |
| 2020/0225721 A1* | 7/2020 | Yu | ............................. | G06F 1/30 |
| 2021/0223838 A1* | 7/2021 | Yeh | .................. | H02M 3/33523 |

\* cited by examiner

*Primary Examiner* — Jaweed A Abbaszadeh
*Assistant Examiner* — Gayathri Sampath (57) ABSTRACT

The present invention provides a processing circuit, a method, and an electronic device for multiple power supply ports. The processing circuit includes N control modules and a bus. Each control module is correspondingly connected to a power supply port. The communication interface of each control module is connected to the bus. The bus is a one-wire bus and is connected to a power line ground through a resistor. The control modules transmit value signals to the bus. The varied range of a first physical quantity of a bus signal carried by the bus is related to first physical quantities or second physical quantities of all target signals transmitted to the bus. The control module detects the first quantity of the bus signal through the communication interface and adjusts the operating parameter of the connected power supply port according to the varied range of the detected first physical quantity.

20 Claims, 5 Drawing Sheets

PROCESSING CIRCUIT, METHOD, AND ELECTRONIC DEVICE FOR MULTIPLE POWER SUPPLY PORTS

FIELD OF THE INVENTION

The present invention relates to the field for supplying power, particularly to a processing circuit, a method, and an electronic device for multiple power supply ports.

BACKGROUND OF THE INVENTION

In an electronic device with multiple power supply ports, different power supply ports (such as universal serial bus ports) can be used to supply power to the outside, so as to play the role of consuming electricity and/or charging. However, the power supply resources (such as the total rated power) of the device are fixed. Thus, the power supply resources (such as the actual output power) of each power supply port need to be dynamically or fixedly allocated. In order to allocate the power supply resources, the power supply information (e.g., power, voltage, current, etc.) of each power supply port is accurately obtained. Each power supply port can supply power under the control of the corresponding port controller. Therefore, the power supply information refers to the specific information mentioned above, and the port controller is the control module mentioned above.

In the related art, in order to obtain the power supply information of the other control modules (for example, the operating parameters of the corresponding power supply port), each control module can be connected to the central controller through a digital signal bus such as an IIC bus. The central controller can obtain the actual operating parameters (such as power, voltage, etc.) through the control module (such as the port controller). In an electronic device with multiple power supply ports, dynamic power allocation can be performed based on the obtained operating parameters, and finally the dynamically-allocated results are applied to each power supply port.

However, this solution requires an additional central controller in addition to the existing control modules and adopts a two-wire communication protocol, which increases the cost of the entire solution.

SUMMARY OF THE INVENTION

The present invention provides a processing circuit, a method, and an electronic device for multiple power supply ports to solve the problem with high cost of the existing solution.

According to a first aspect of the present invention, a processing circuit for multiple power supply ports is provided, which comprises N control modules and a bus, each of the N control modules is correspondingly connected to a power supply port, wherein N is an integer larger than or equal to 2, a communication interface of each of the N control modules is connected to the bus, the bus is connected to a power line ground through a resistor, and the bus is a one-wire bus;

the control modules transmit value signals to the bus, the value signals represent values of present power supply information corresponding to the control modules, the present power supply information represents any one of the operating parameters of the power supply port connected to the control module, and a varied range of a first physical quantity of a bus signal carried by the bus is related to first physical quantities or second physical quantities of all target signals transmitted to the bus;

the control module detects the first quantity of the bus signal carried by the bus through the communication interface and adjusts the operating parameter of the connected power supply port according to the varied range of the detected first physical quantity.

In an embodiment, when the control module controls the operating parameter of the connected power supply port according to a varied range of the detected first physical quantity, the control module is configured to:

determine a sum of second physical quantities of signals transmitted from other control modules connected to the bus to the bus and use the sum to represent a sum of present power supply information of other control modules according to the first physical quantity of the bus signal;

adjust the operating parameter of the connected power supply port according to the sum of present power supply information of other control modules.

In an embodiment, the control module comprises a detection unit and a protocol processing unit, the detection unit is connected to the communication interface and the protocol processing unit, the detection unit detects and feeds the first physical quantity of the bus signal to the protocol processing unit, the protocol processing unit is connected to the corresponding power supply port, and the protocol processing unit adjusts the operating parameter of the connected power supply port according to the varied range of the detected first physical quantity.

In an embodiment, the protocol processing unit comprises a charging protocol subunit and a communication protocol subunit, the communication protocol subunit is respectively connected to the detection unit and the charging protocol subunit, a sum of the second physical quantities is determined and calculated by the communication protocol subunit and fed to the charging protocol subunit or is determined and calculated by the charging protocol subunit, the charging protocol subunit is connected to the corresponding power supply port, and the charging protocol subunit adjusts the operating parameter of the connected power supply port according to the varied range of the detected first physical quantity.

In an embodiment, the control module comprises an output control unit and a protocol processing unit, the output control unit is connected to the communication interface, and the protocol processing unit is connected to the output control unit and the corresponding power supply port;

the value signal is transmitted from the output control unit of the corresponding control module to the bus, and the value signal is determined by the protocol processing unit of the corresponding control module according to the present information of the power supply port that connected to the protocol processing unit.

In an embodiment, the protocol processing unit comprises a charging protocol subunit and a communication protocol subunit, the communication protocol subunit is respectively connected to the detection unit and the charging protocol subunit, the charging protocol subunit is connected to the corresponding power supply port, and the value signal is determined by the charging protocol subunit and/or the communication protocol subunit of the corresponding control module according to present information determined by the charging protocol subunit.

In an embodiment, the different control modules are arranged in different chips and the chips are USB PD charging protocol chips.

In an embodiment, the first physical quantities are voltage and the second physical quantities are current.

In an embodiment, the operating parameter comprises one of power, voltage, current, and temperature.

According to a second aspect of the present invention, an electronic device comprising the processing circuit for multiple power supply ports and the N power supply ports of the first aspect is provided.

According to a third aspect of the present invention, a processing method for multiple power supply ports applied to one present control module of N control modules, each of the N control modules for power management is correspondingly connected to a power supply port, N is an integer larger than or equal to 2, the communication interface of each of the N control modules is connected to the same bus, the bus is connected to a power line ground through a resistor, the bus is a one-wire bus, and the method comprises:

when obtaining present information transmitted by the other control modules, detecting a first physical quantity of the bus signal carried by the bus through the communication interface;

when transmitting present power supply information to the other control modules, transmitting a value signal to the bus, the value signals represent values of present power supply information of the control modules, and a varied range of a first physical quantity of a bus signal carried by the bus is related to first physical quantities or second physical quantities of all target signals transmitted to the bus;

the present power supply information represents any one of the operating parameters of the power supply port connected to the control module.

In an embodiment, after detecting the first physical quantity of the bus signal carried by the bus through the communication interface, the method further comprises:

determining the sum of second physical quantities of signals transmitted from other control modules connected to the bus to the bus and using the sum to represent a sum of present power supply information of other control modules according to the first physical quantity of the bus signal.

In an embodiment, the first physical quantities are voltage and the second physical quantities are current.

In an embodiment, the operating parameter comprises any one of power, voltage, current, and temperature, etc.

The present invention provides a processing circuit, a method, and an electronic device for multiple power supply ports. Since each control module is connected to the same one-wire bus through the communication interface. The bus signal carried by the bus is influenced and changed by the value signal transmitted from the control module. To a certain extent, the bus signal is implemented with an analog signal that represents the information represented by the value signal. Furthermore, each control module detects the first physical quantity of the bus signal in order to conveniently obtain the information of the other modules instead of uploading the information to a central controller for unified management. As a result, a central processor and a bi-directional communication bus are not arranged, thereby decreasing the cost.

In addition, the present invention inventively proposes that the varied range of the physical quantity of the bus signal is related to the information that needs to be transmitted and corresponds to the same time when communication among multiple modules is implemented by using bus. In the conventional technology, the bus transmits digital signals to achieve communication. On the contrary, without requiring clock information and monopolizing the bus, the present invention simultaneously transmits signals to the bus at any time to reduce the cost of the solution and simplify the circuit and the processing procedure.

Besides, discrete signals are used to represent information during digital signal communication. The present invention uses the varied range of the physical quantity of the bus signal to relate with the information. As a result, the logic of the represented information of the bus signal of the present invention is different from that of the digital signal bus. In the present invention, the bus signal is the result of the joint action of all target signals, wherein the result does not represent the information transmitted by a certain module. The bus can only use digital signals to respectively transmit information that each module needs to transmit. Thus, the represented information of the bus signal of the present invention is different from that of the digital signal bus.

Accordingly, even if the bus of the present invention and the conventional digital signal bus are both connected to multiple modules, the represented information is still different since the logics of the represented information are different. It is impossible to use any digital signal bus to implement the communication method of the present invention.

BRIEF DESCRIPTION OF THE DRAWINGS

Below, the embodiments are described in detail in cooperation with the drawings to make easily understood the technical contents, characteristics and accomplishments of the present invention. Obviously, the drawings in the following description are only some embodiments of the present invention. For those of ordinary skill in the art, other drawings can be obtained based on these drawings without creative labor.

Description of the reference numerals:
11—power supply port;
12—control module;
121—communication interface;
122—detection unit;
1221—voltage detection unit;
123—protocol processing unit;
124—output control unit;
13—bus.

DETAILED DESCRIPTION OF THE EMBODIMENTS

The technical implementations in the embodiments of the present invention will be clearly and completely described below in cooperation with the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

The terms "first", "second", "third", "fourth", etc. (if any) in the description and claims of the present invention and the above-mentioned drawings are used to distinguish similar objects, but not necessarily describe a specific order. It should be understood that the data used in this way can be interchanged under appropriate circumstances so that the embodiments of the present invention described herein can be implemented in a sequence other than those illustrated or described herein. In addition, the terms "include" and "have" and any variations of them are intended to cover non-exclusive inclusion. For example, a process, method, system, product or device that includes a series of steps or units is not necessarily limited to the clearly listed steps or units. Those steps or units may include other steps or units that are not clearly listed or are inherent to these processes, methods, products, or equipment.

The technical implementation of the present invention will be described in detail below with specific embodiments. The following specific embodiments can be combined with each other, and the same or similar concepts or processes may not be repeated in some embodiments.

Figure 1:
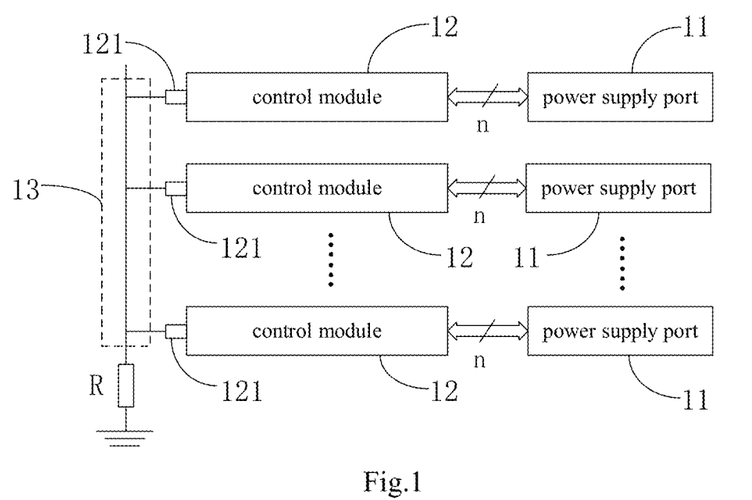
FIG. 1 is a diagram schematically illustrating a processing circuit for multiple power supply ports and the power supply ports according to an embodiment of the present invention.
Figure 2:
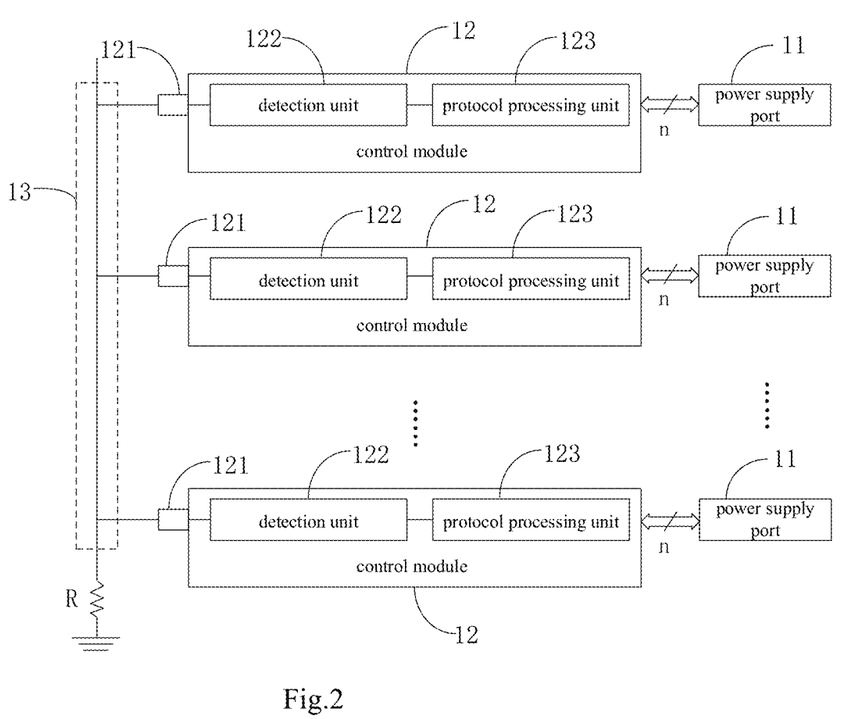
FIG. 2 is a diagram schematically illustrating a processing circuit for multiple power supply ports and the power supply ports according to an embodiment of the present invention.
Figure 3:
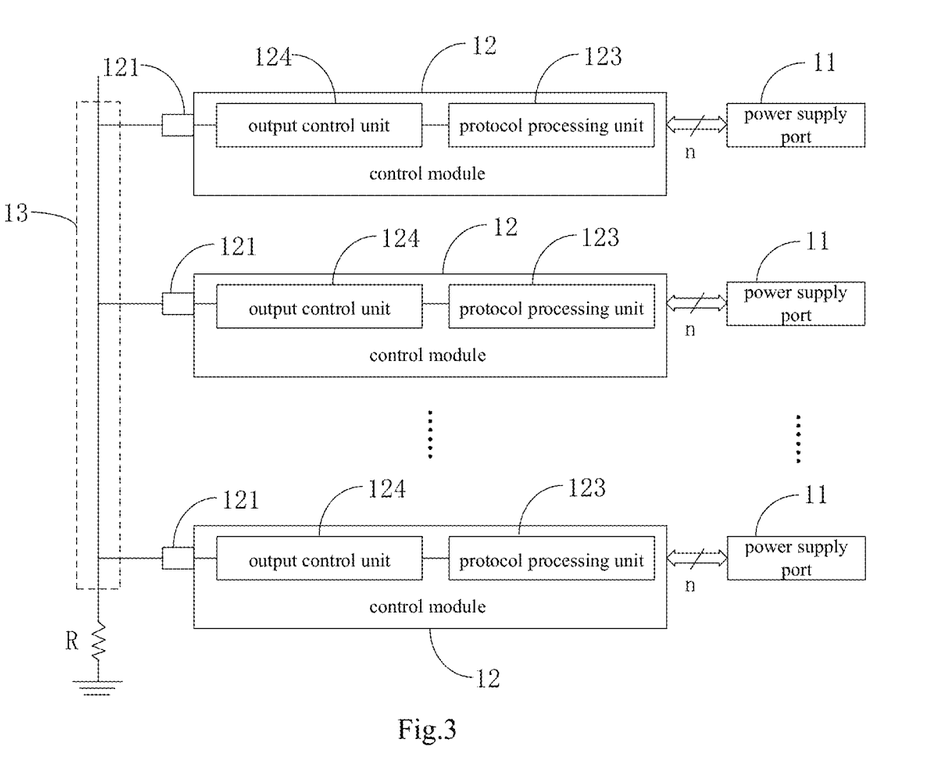
FIG. 3 is a diagram schematically illustrating a processing circuit for multiple power supply ports and the power supply ports according to an embodiment of the present invention.
Figure 4:
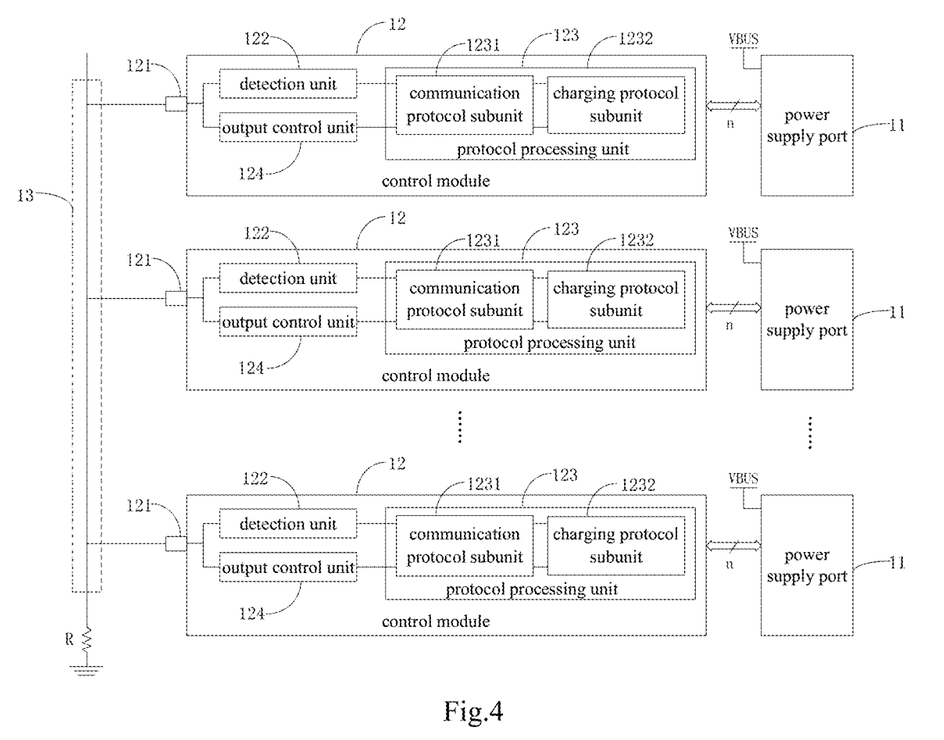
FIG. 4 is a diagram schematically illustrating a processing circuit for multiple power supply ports and the power supply ports according to an embodiment of the present invention.

FIG. 1 is a diagram schematically illustrating a processing circuit for multiple power supply ports and the power supply ports according to an embodiment of the present invention. FIG. 2 is a diagram schematically illustrating a processing circuit for multiple power supply ports and the power supply ports according to an embodiment of the present invention. FIG. 3 is a diagram schematically illustrating a processing circuit for multiple power supply ports and the power supply ports according to an embodiment of the present invention. FIG. 4 is a diagram schematically illustrating a processing circuit for multiple power supply ports and the power supply ports according to an embodiment of the present invention.

With reference to FIG. 1, The processing circuit for multiple power supply ports includes N control modules 12 and a bus 13. Each of the N control modules 12 is correspondingly connected to a power supply port 11, wherein N is an integer larger than or equal to 2. The communication interface 121 of each of the N control modules 12 is connected to the bus 13. The bus 13 is connected to the power line ground through a resistor R. The bus is a one-wire bus.

The power supply port 11 is a port with any structure. As long as the port can output power to the outside, the demands for consuming power or charging external devices are included within the scope of the embodiment. In an embodiment, the power supply port can be a USB port of Type-C, Type-A, or Type-B standard. In other embodiments, other ports or the lightning ports can be used.

The control module 12 is directly or indirectly connected to the power supply port 11. It can be understood that the direct or indirect connection for the power supply information of the power supply port obtained by the corresponding control module is included within the scope of the embodiment. For example, the power supply information of the power supply port is controlled and determined by the control module. The control module can obtain its power supply information. For further example, the power supply information of the power supply port is detected by the control module through the related circuit.

In the embodiment, the communication interface 121 of each control module 12 is connected to the bus 13. The bus 13 is connected to the power line ground through the bus resistor R. The bus 13 is a one-wire bus. The bus 13 is directly connected to a bus power. Alternatively, the bus 13 is connected to the bus power through another bus resistor. It can be understood that the one-wire bus has a current-flowing path along a single direction, wherein the current can flow from a terminal far from the power line ground (e.g., the power terminal) to the power line ground. As long as the description is satisfied, the method of forming the circuit and the metal wires, the method of wiring the metal wires, and the size and the number of the metal wires are included within the scope of the embodiment.

Compared with the bi-directional communication bus, the one-wire bus has lower cost. The embodiment arranges the control module 12 and the corresponding processing procedure based on the one-wire bus, such that the control module 12 obtains the power supply information of the other control modules 12. Simultaneously, due to the one-wire bus, the value signal of any control module can have an effect on the bus. Thus, the other modules can accurately know the effect.

In the embodiment, the control module 12 can transmit the value signal to the bus 13 through the communication interface 121, such that the first physical quantity of the bus signal correspondingly changes. The varied range of the first physical quantity of the bus signal carried by the bus is related to the first physical quantities or second physical quantities of all target signals transmitted to the bus.

The control module 12 detects the first quantity of the bus signal carried by the bus 13 through the communication interface 121 and adjusts the operating parameter of the connected power supply port according to the varied range of the detected first physical quantity.

It can be understood that the value signal represents the value of the present power supply information of the power supply port connected to the corresponding control module. In addition, the value signal is outputted such that the first physical quantity correspondingly changes in order to conveniently identify the power supply information and the other related information.

It can be understood that the present power supply information represents one of the operating parameters of the power supply port connected to the present main module. The operating parameter includes, for example, power, voltage, current, temperature, etc. The value of the value signal may be the corresponding value of power, voltage, current, or temperature. Alternatively, the embodiment uses other parameters and the corresponding values.

In the foregoing embodiments, each control module is connected to the same one-wire bus through the communication interface and the bus signal carried by the bus is influenced and changed by the value signal transmitted by the main module. To a certain extent, the bus signal represents the power supply information represented by the value signal. Furthermore, each control module detects the first physical quantity of the bus signal in order to conveniently obtain the power supply information of the power supply port controlled by the other modules instead of uploading the information to a central controller for unified management. As a result, a central processor and a bi-directional communication bus are not arranged, thereby effectively decreasing the cost.

If N=2, a part of the conventional technology can also use a bi-directional communication circuit to connect to two control modules, such that the control modules communicate with each other to obtain power supply information. However, the conventional technology does not support the situation for 3-to-3 power supply ports. On the contrary, not limited by the number, the present invention can support the situation for 3-to-3 power supply ports. Since the bi-directional communication circuit is not arranged, the cost can be reduced.

In an embodiment, when the control module adjusts the operating parameter of the connected power supply port according to the varied range of the detected first physical quantity, the control module is configured to:

determine the sum of second physical quantities of signals transmitted from other control modules connected to the bus to the bus and use the sum to represent the sum of present power supply information of other control modules according to the first physical quantity of the bus signal;

adjust the operating parameter of the connected power supply port according to the sum of present power supply information of the other control modules.

The first physical quantities may be voltage and the second physical quantities may be current. In other embodiments, the second physical quantities may be voltage or power and first physical quantities may be power.

The sum of the present power supply information and the adjusted operating parameter may be the same parameter. For example, the power of the connected power supply port is adjusted based on the sum of power of the other control modules. In other examples, the sum of the present power supply information and the adjusted operating parameter may be different parameters. For example, the voltage and current of the connected power supply port are adjusted based on the sum of power of the other control modules. Alternatively, the power of the connected power supply port is adjusted based on the sum of the temperature of the other control modules.

For example, the first physical quantity is voltage and the second physical quantity is current. If each control module is arranged in a chip, $I(total)=I(1)+ \ldots I(n) \ldots +I(N)=V \div R$;

wherein, $I(n)$ represents a current outputted from the nth control module to the bus, namely the second physical quantity outputted from nth control module to the bus;

$I(total)$ represents the sum of currents outputted from all the modules to the bus, namely the sum of the second physical quantities of the signals outputted by all the modules;

V represents the voltage of the presently-detected bus signal, namely the first physical quantity of the bus signal;

R represents the resistance of the bus resistor.

The current flowing through the bus resistor is equal to the sum of currents of output currents of all the modules. Thus, $I(total)$ is obtained based on the foregoing equation.

For the kth control module, the sum of the second physical quantities of the other related control modules is $I(others)=I(total)-I(k)$.

In the embodiment, the operating parameter of the connected power supply port is adjusted based on the sum of the present power supply information of the other control modules. For example, if the sum of the present power supply information is the sum of power, the power of the connected power supply port is adjusted based on the sum of power. For example, the sum of power of all the power supply ports can reach the maximum value. Alternatively, the sum of power of all the power supply ports is less than a secure power threshold.

$I(others)$ may represent the sum of the present power supply information of the other control modules. Then, $I(others)$ can be converted into the specific value of the sum of the power supply information. In other situations, $I(total)$ or its converted specific value can be used without separating from $I(k)$. Besides, the statistical information such as the mean value is calculated based on $I(others)$, $I(total)$, or their converted specific values. The other processing requirements are satisfied based on $I(others)$ and $I(total)$ in different periods or their converted specific value.

Thus, based on the processing requirements for various situations, any calculation and process are implemented within the scope of the embodiment.

In an embodiment, as illustrated in FIG. 2, the control module 12 includes a detection unit 122 and a protocol processing unit 123. The detection unit 122, connected to the communication interface 121 and the protocol processing unit 123, detects and feeds the first physical quantity of the bus signal to the protocol processing unit 123. The protocol processing unit 123 is connected to the corresponding power supply port. The protocol processing unit 123 adjusts the operating parameter of the connected power supply port according to the varied range of the first physical quantity detected.

If the first physical quantity is voltage, the detection unit 122 will be a voltage detection unit.

Referring to FIG. 4, the protocol processing unit 123 may include a charging protocol subunit 1232 and a communication protocol subunit 1231. The communication protocol subunit 1231 is respectively connected to the detection unit 122 and the charging protocol subunit 1232. The sum of the second physical quantities is determined by the communication protocol subunit 1231 and fed to the charging protocol subunit 1232. The charging protocol subunit 1232 is connected to the corresponding power supply port 11. The charging protocol subunit 1232 adjusts the operating parameter of the connected power supply port 11 according to the varied range of the detected first physical quantity.

It is understood that the charging protocol subunit 1232 may be a circuit subunit for processing based on the charging protocol. The charging protocol subunit 1232 may be a circuit subunit in the existing control module, such as a circuit subunit based on the USB PD protocol. It is understood that the communication protocol subunit 1231 may be a circuit subunit for processing based on the communication protocol.

In other embodiments, if the charging behavior is not used, the charging protocol subunit will not be used or another circuit will be used.

In an embodiment, as illustrated in FIG. 3, the control module 12 includes an output control unit 124 and a protocol processing unit 123. The output control unit 124 is connected to the communication interface 121. The protocol processing unit 123 is connected to the output control unit 124 and the corresponding power supply port 11.

The value signal is transmitted from the output control unit 124 of the corresponding control module to the bus 23. The value signal is determined by the protocol processing unit 123 of the corresponding control module according to present information of the connected power supply port 11. In implementation, the output control unit 124 may be a current control unit.

Referring to FIG. 4, the protocol processing unit 123 includes a charging protocol subunit 1232 and a communication protocol subunit 1231. The communication protocol subunit 1231 is respectively connected to the output control unit 124 and the charging protocol subunit 1232. The charging protocol subunit 1232 is connected to the corresponding power supply port 11. The value signal is determined by the charging protocol subunit 1232 and/or the communication protocol subunit 1231 of the corresponding control module according to the present information determined by the charging protocol subunit 1232.

It is understood that the charging protocol subunit 1232 is a circuit subunit for processing based on the charging protocol. The charging protocol subunit 1232 may be a circuit subunit in the existing control module, such as a circuit subunit based on the USB PD protocol. It is understood that the communication protocol subunit 1231 may be a circuit subunit for processing based on the communication protocol.

In other embodiments, if the charging behavior is not used, the charging protocol subunit will not be used or another circuit will be used.

In implementation, different control modules may be arranged in different chips. The chip may be a USB PD charging protocol chip or another charging protocol chip. Depending on the different ports used, the corresponding chip can adopt different charging protocols.

The foregoing chips are represented with {Chip(i), i=1, . . . , N}.

Figure 5:
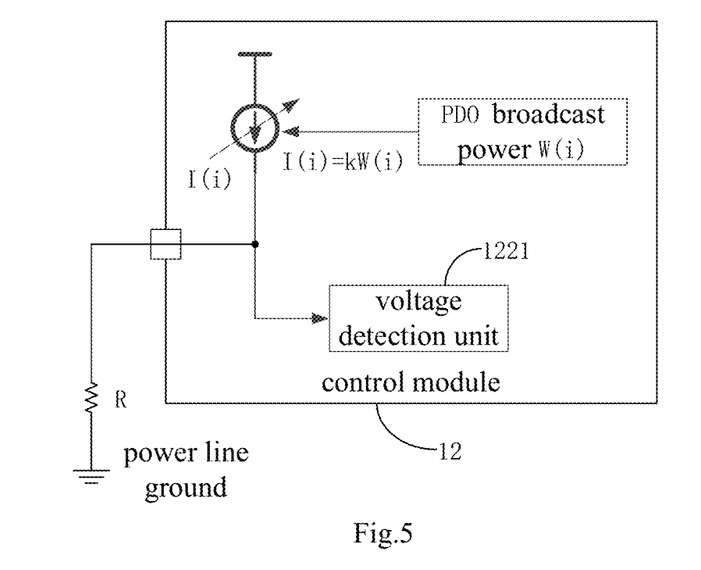
FIG. 5 is a diagram schematically illustrating a circuit for determining broadcast power according to an embodiment of the present invention.

FIG. 5 is a diagram schematically illustrating a circuit for determining broadcast power according to an embodiment of the present invention.

The process of determining power supply information including power as the operating parameter is taken as an example for detailed explanation. The other processes of determining the other operating parameters such as voltage and current can also be understood with reference to this process.

The value of the value signal generated by the chip is power. Correspondingly, the chip needs to obtain the power supply information of the other chips, namely broadcast power.

For example, the current control units of all the chips {Chip(i), i=1, . . . , N} transmit the value signals being power to the bus, wherein the currents of the value signals are represented with I(i), and i=1, . . . , N. The currents I(i) may represent W(i). That is to say, I(i)=kW(i) and k is a ratio coefficient.

The voltage detection unit 1221 detects the voltage signal VS of the bus XPLINK. The communication protocol processing module can calculate the signal I(total)= I(1)+ . . . +I(N)=VS÷R. I(total) represents the sum of currents outputted from all the chips {Chip(i), i=1, . . . , N} to the interconnected bus XPLINK.

The protocol processing unit further calculates I(others)= I(1)+ . . . +I(i−1)+I(i+1)+ . . . +I(N)=I(total)−I(i). I(others) represents the sum of currents outputted from all the chips {Chip(i), i=1, . . . , i−1, i+1, . . . , N} except the chip Chip(i) to the interconnected bus XPLINK.

All the chips Chip(i) may obtain the sum of currents generated by chips {Chip(i), i=1, . . . , i−1, i+1, . . . , N} interconnected to the bus by calculating the value of I(others). After obtaining the sum, it can also be regarded as obtaining the sum of power of the other chips interconnected to the bus. Thus, the sum of broadcast power of the other USB PD chips interconnected to the bus.

When the value of the value signal is voltage, current, or temperature, all the chips Chip(i) can obtain the sum of physical quantities such as voltage, current, or temperature of the other chips interconnected to the bus.

In an embodiment, an electronic device including the processing circuit for multiple power supply ports and the N power supply ports of the foregoing embodiments.

The electronic device may be a charging device dedicated to charging, such as a portable battery. The electronic device may also be a power supply device dedicated to supplying power, such as a power socket. The electronic device may be equipped with multiple power supply ports and not dedicated to supplying power and charging, such as a computer, a camera, a mobile phone, a household appliance, industrial equipment, etc. The electronic device can supply power to the equipment connected to the power supply port of the electronic device to satisfy requirements for power consumption or charging. It can be seen that an electronic device that has any functions and meets the description of the embodiment is included within the scope of the embodiment.

According to the embodiments provided above, the processing circuit for multiple power supply ports and the electronic device are provided. Since each control module is connected to the same one-wire bus through the communication interface. The bus signal carried by the bus is influenced and changed by the value signal transmitted from the control module. To a certain extent, the bus signal is implemented with an analog signal that represents the information represented by the value signal. Furthermore, each control module detects the first physical quantity of the bus signal in order to conveniently obtain the information of the other modules instead of uploading the information to a central controller for unified management. As a result, a central processor and a bi-directional communication bus are not arranged, thereby decreasing the cost.

Figure 6:
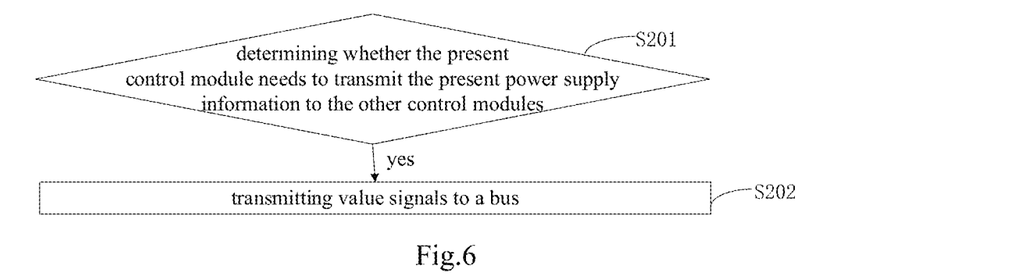
FIG. 6 is a flowchart of a processing method for multiple power supply ports according to an embodiment of the present invention.
Figure 7:
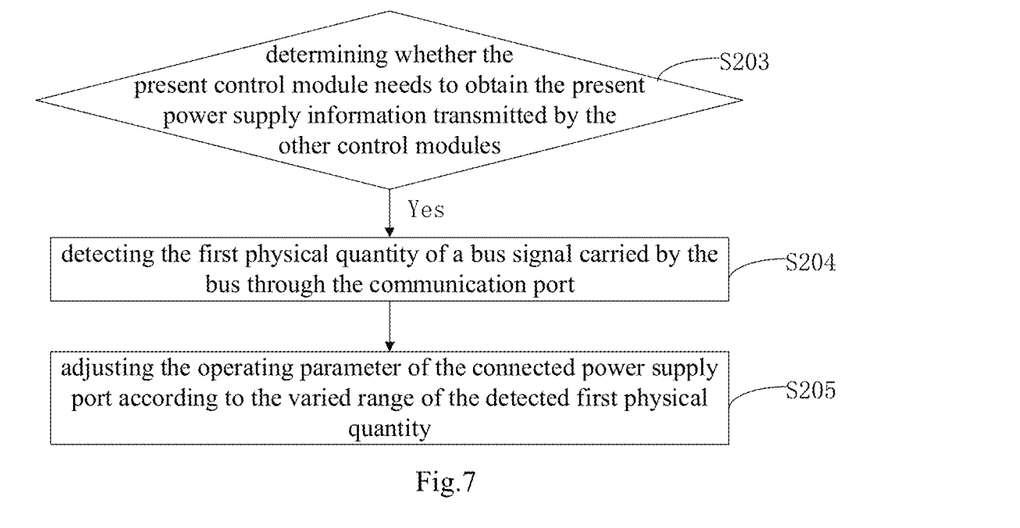
FIG. 7 is a flowchart of a processing method for multiple power supply ports according to an embodiment of the present invention.
Figure 8:
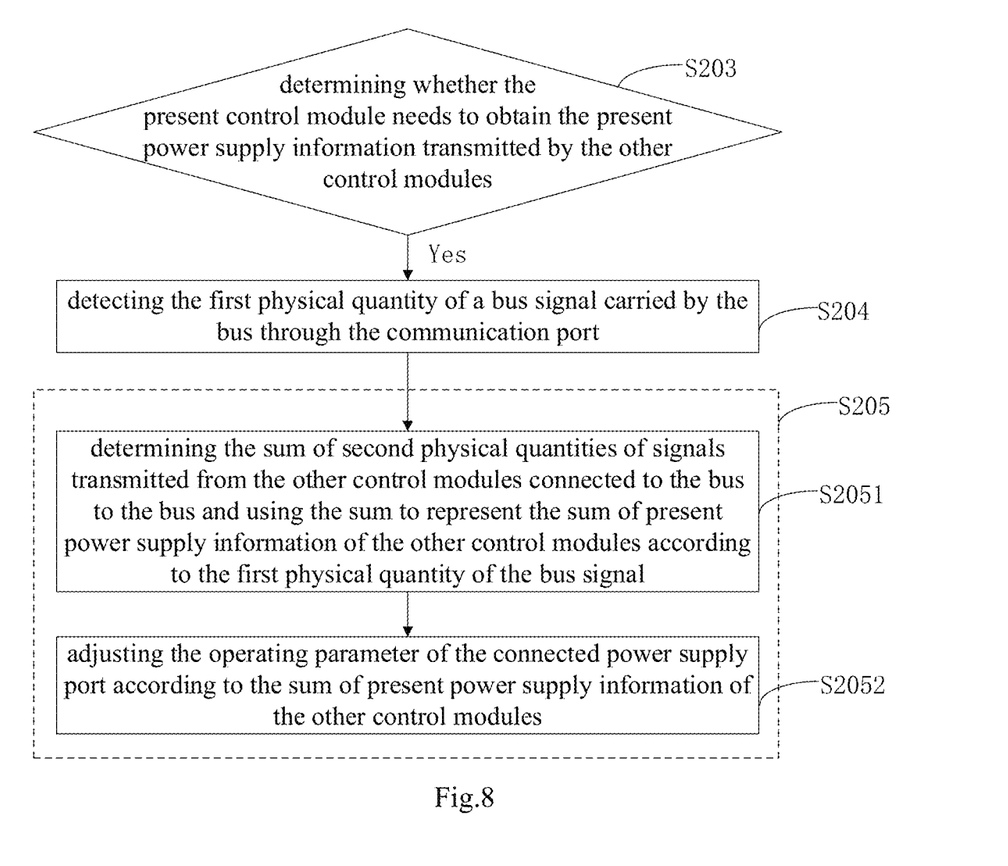
FIG. 8 is a flowchart of a processing method for multiple power supply ports according to an embodiment of the present invention.

FIG. 6 is a flowchart of a processing method for multiple power supply ports according to an embodiment of the present invention. FIG. 7 is a flowchart of a processing method for multiple power supply ports according to an embodiment of the present invention. FIG. 8 is a flowchart of a processing method for multiple power supply ports according to an embodiment of the present invention.

In the embodiment, the method can be applied to the processing circuit for multiple power supply ports and one present control module of N control modules of the electronic device. Each of the N control modules for power management is correspondingly connected to a power supply port, wherein N is an integer larger than or equal to 2. The communication interface of each of the N control modules is connected to the same bus. The bus is connected to a power line ground through a resistor. The bus is a one-wire bus.

Referring to FIG. 6, the method includes:

S201: determining whether the present control module needs to transmit the present power supply information to the other control modules;

if the result of Step S201 is yes, performing Step S202 and transmitting value signals to a bus.

It is understood that the value signals are transmitted to the bus when the present control module needs to transmit the present power supply information to the other control modules. The value signal represents the value of the present power supply information corresponding to the present control module. The present power supply information represents an operating parameter of the power supply port connected to the corresponding control module. The varied range of the first physical quantity is related to the first physical quantities or the second physical quantities of the target signals transmitted to the bus.

Referring to FIG. 7, the method includes:

S203: determining whether the present control module needs to obtain the present power supply information transmitted by the other control modules;

if the result of Step S203 is yes, performing Step S204 of detecting the first physical quantity of a bus signal carried by the bus through the communication interface;

S205: adjusting the operating parameter of the connected power supply port according to the varied range of the detected first physical quantity.

It is understood that the first physical quantity of the bus signal carried by the bus is detected through the communication interface and the operating parameter of the connected power supply port is adjusted according to the varied range of the detected first physical quantity when the present control module needs to obtain the present power supply information transmitted by the other control modules.

Refer to FIG. 8. In an embodiment, Step S205 may include:

S2051: determining the sum of second physical quantities of signals transmitted from the other control modules connected to the bus to the bus and using the sum to represent the sum of present power supply information of the other control modules according to the first physical quantity of the bus signal;

S2052: adjusting the operating parameter of the connected power supply port according to the sum of present power supply information of the other control modules.

In each step of the foregoing method, the technical terms, alternative implementations, and technical effects can be understood with reference to the descriptions of the processing circuit for multiple power supply ports and the electronic device. The repeated parts will not be repeated here.

According to the embodiments provided above, the processing method for multiple power supply ports and the electronic device are provided. Since each control module is connected to the same one-wire bus through the communication interface. The bus signal carried by the bus is influenced and changed by the value signal transmitted from the control module. To a certain extent, the bus signal is implemented with an analog signal that represents the information represented by the value signal. Furthermore, each control module detects the first physical quantity of the bus signal in order to conveniently obtain the information of the other modules instead of uploading the information to a central controller for unified management. As a result, a central processor and a bi-directional communication bus are not arranged, thereby decreasing the cost.

A person of ordinary skill in the art can understand that all or parts of the steps in the foregoing method can be implemented by hardware for program instructions. The foregoing program can be stored in a computer readable storage medium. When the program is executed, the steps including the foregoing method are executed. The foregoing storage medium includes a ROM, a RAM, a magnetic disk, an optical disk, or a media that can store program codes.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A processing circuit for multiple power supply ports, comprising N control modules and a bus, each of the N control modules is correspondingly connected to a power supply port, wherein N is an integer larger than or equal to 2, a communication interface of each of the N control modules is connected to the bus, the bus is connected to a power line ground through a resistor, and the bus is a one-wire bus;

each of the N control modules is capable to transmit a value signal to the bus, the value signal represents a value of present power supply information of a corresponding control module, the present power supply information represents any one of the operating parameters of the power supply port connected to the corresponding control module, and a varied range of a physical quantity of a bus signal carried by the bus is related to first physical quantities or second physical quantities of all target signals transmitted from each of the N control modules to the bus; and each of the N control modules is capable to detect the physical quantity of the bus signal carried by the bus through the communication interface and adjust the operating parameter of the connected power supply port according to the varied range of the detected physical quantity.

2. The processing circuit according to claim 1, wherein when a control module adjusts the operating parameter of the connected power supply port according to the varied range of the detected physical quantity, the control module is configured to:

determine a sum of second physical quantities of signals transmitted from other control modules connected to the bus to the bus and use the sum to represent a sum of present power supply information of other control modules according to the varied range of the detected physical quantity of the bus signal; and adjust the operating parameter of the connected power supply port according to the sum of present power supply information of the other control modules.

3. The processing circuit according to claim 2, wherein the control module comprises a detection unit and a protocol processing unit, the detection unit is respectively connected to the communication interface and the protocol processing unit, the detection unit detects and feeds the detected physical quantity of the bus signal to the protocol processing unit, the protocol processing unit is connected to the corresponding power supply port, and the protocol processing unit adjusts the operating parameter of the connected power supply port according to the varied range of the detected physical quantity.

4. The processing circuit according to claim 3, wherein the control module comprises an output control unit and a protocol processing unit, the output control unit is connected to the communication interface, and the protocol processing unit is connected to the output control unit and the corresponding power supply port;

the value signal is transmitted from the output control unit of the corresponding control module to the bus, and the value signal is determined by present information of the power supply port connected to the protocol processing unit of the corresponding control module.

5. The processing circuit according to claim 3, wherein the protocol processing unit comprises a charging protocol subunit and a communication protocol subunit, the communication protocol subunit is respectively connected to the detection unit and the charging protocol subunit; the sum of the second physical quantities is determined and calculated by the communication protocol subunit and fed to the charging protocol subunit, or is determined and calculated by the charging protocol subunit; the charging protocol subunit is connected to the corresponding power supply port, and the charging protocol subunit adjusts the operating parameter of the connected power supply port according to the varied range of the detected physical quantity.

6. The processing circuit according to claim 5, wherein the control module comprises an output control unit and a protocol processing unit, the output control unit is connected to the communication interface, and the protocol processing unit is connected to the output control unit and the corresponding power supply port;
the value signal is transmitted from the output control unit of the corresponding control module to the bus, and the value signal is determined by present information of the power supply port connected to the protocol processing unit of the corresponding control module.

7. The processing circuit according to claim 2, wherein the control module comprises an output control unit and a protocol processing unit, the output control unit is connected to the communication interface, and the protocol processing unit is connected to the output control unit and the corresponding power supply port;
the value signal is transmitted from the output control unit of the corresponding control module to the bus, and the value signal is determined by present information of the power supply port connected to the protocol processing unit of the corresponding control module.

8. The processing circuit according to claim 1, wherein the control module comprises an output control unit and a protocol processing unit, the output control unit is connected to the communication interface, and the protocol processing unit is connected to the output control unit and the corresponding power supply port;
the value signal is transmitted from the output control unit of the corresponding control module to the bus, and the value signal is determined by present information of the power supply port connected to the protocol processing unit of the corresponding control module.

9. The processing circuit according to claim 8, wherein the protocol processing unit comprises a charging protocol subunit and a communication protocol subunit, the communication protocol subunit is respectively connected to the detection unit and the charging protocol subunit, the charging protocol subunit is connected to the corresponding power supply port, and the value signal is determined by the charging protocol subunit and/or the communication protocol subunit of the corresponding control module according to present information determined by the charging protocol subunit.

10. The processing circuit according to claim 1, wherein the different control modules are arranged in different chips and the chips are USB PD charging protocol chips.

11. The processing circuit according to claim 1, wherein the first physical quantities are voltage and the second physical quantities are current.

12. The processing circuit according to claim 1, wherein the operating parameter comprises one of power, voltage, current, and temperature.

13. An electronic device comprising the processing circuit for multiple power supply ports and the N power supply ports of claim 1.

14. The electronic device according of claim 13, wherein when a control module adjusts the operating parameter of the connected power supply port according to the varied range of the detected first physical quantity, the control module is configured to:
determine a sum of second physical quantities of signals transmitted from other control modules connected to the bus and use the sum to represent a sum of present power supply information of other control modules according to the varied range of the detected physical quantity of the bus signal; and
adjust the operating parameter of the connected power supply port according to the sum of present power supply information of the other control modules.

15. The electronic device according of claim 14, wherein the control module comprises a detection unit and a protocol processing unit, the detection unit is respectively connected to the communication interface and the protocol processing unit, the detection unit detects and feeds the physical quantity of the bus signal to the protocol processing unit, the protocol processing unit is connected to the corresponding power supply port, and the protocol processing unit adjusts the operating parameter of the connected power supply port according to the varied range of the detected physical quantity.

16. The electronic device according of claim 15, wherein the protocol processing unit comprises a charging protocol subunit and a communication protocol subunit, the communication protocol subunit is respectively connected to the detection unit and the charging protocol subunit; the sum of the second physical quantities is determined and calculated by the communication protocol subunit and fed to the charging protocol subunit, or is determined and calculated by the charging protocol subunit; the charging protocol subunit is connected to the corresponding power supply port, and the charging protocol subunit adjusts the operating parameter of the connected power supply port according to the varied range of the detected physical quantity.

17. A processing method for multiple power supply ports applied to one present control module of N control modules, each of the N control modules for power management is correspondingly connected to a power supply port, N is an integer larger than or equal to 2, a communication interface of each of the N control modules is connected to a same bus, the bus is connected to a power line ground through a resistor, the bus is a one-wire bus, and the method comprises:
when obtaining present power supply information transmitted by other control modules, detecting a physical quantity of the bus signal carried by the bus through the communication interface; and
when transmitting present power supply information to the other control modules, transmitting a value signal to the bus, the value signal represents a value of present power supply information of a corresponding control module, and a varied range of a physical quantity of a bus signal carried by the bus is related to first physical quantities or second physical quantities of all target signals transmitted from each of the N control modules to the bus, wherein the present power supply information represents an operating parameter of the power supply port connected to the corresponding control module.

18. The processing method according to claim 17, wherein after detecting the physical quantity of the bus signal carried by the bus through the communication interface, the method further comprises:

determining a sum of second physical quantities of signals transmitted from other control modules connected to the bus to the bus and using the sum to represent a sum of present power supply information of other control modules according to the varied range of the detected physical quantity of the bus signal.

19. The processing method according to claim 18, wherein the first physical quantities are voltage and the second physical quantities are current.

20. The processing method according to claim 19, wherein the operating parameter comprises one of power, voltage, current, and temperature.

\* \* \* \* \*